(12) United States Patent
Waldrum

(10) Patent No.: US 11,918,084 B2
(45) Date of Patent: *Mar. 5, 2024

(54) SHOE SIZE MEASUREMENT DEVICES AND METHODS

(71) Applicant: Faye Cary Waldrum, Camden, TN (US)

(72) Inventor: Faye Cary Waldrum, Camden, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,473

(22) Filed: Nov. 21, 2022

(65) Prior Publication Data
US 2023/0157419 A1   May 25, 2023

Related U.S. Application Data

(63) Continuation of application No. 17/489,367, filed on Sep. 29, 2021, now Pat. No. 11,503,880.

(51) Int. Cl.
*G01B 3/00* (2006.01)
*A43D 1/02* (2006.01)
(Continued)

(52) U.S. Cl.
CPC ............ *A43D 1/02* (2013.01); *G01B 3/004* (2013.01); *G01B 3/1056* (2013.01); *G01B 3/1061* (2013.01); *G01B 2003/1064* (2013.01)

(58) Field of Classification Search
CPC .... G01B 3/004; G01B 3/1056; G01B 3/1061; G01B 2003/1064
See application file for complete search history.

(56) References Cited

U.S. PATENT DOCUMENTS

| 451,552 A | 5/1891 | Damer |
|---|---|---|
| 1,682,366 A | 8/1928 | Brannock |

(Continued)

FOREIGN PATENT DOCUMENTS

| CN | 106556297 B | 2/2020 |
|---|---|---|
| GB | 1260201 A | 1/1972 |

(Continued)

OTHER PUBLICATIONS

Grainger (https://www.grainger.com/product/JOHNSON-16-ft-Steel-SAE-Tape-Measure-6XUR8); accessed Sep. 27, 2021.

(Continued)

*Primary Examiner* — Yaritza Guadalupe-McCall
(74) *Attorney, Agent, or Firm* — TROUTMAN PEPPER HAMILTON SANDERS LLP; John A. Morrissett; Aaron E. Johnston

(57) ABSTRACT

A measurement device that allows all users to conveniently and discreetly determine appropriate general footwear measurements at any age is disclosed. The device may include a housing having a contact edge configured to receive the heel or a first side edge of the user's foot, a retractable tape configured to extend outwardly from the housing, and a toe flange proximate the distal end of the retractable tape that is configured to receive the toe or a second side edge of the user's foot. The retractable tape may have indicia of barleycorn units of measurement that can easily be used to determine footwear sizes (length and width) in English speaking countries.

20 Claims, 13 Drawing Sheets

Related U.S. Application Data

(60) Provisional application No. 63/130,024, filed on Dec. 23, 2020, provisional application No. 63/084,717, filed on Sep. 29, 2020.

(51) Int. Cl.
  *G01B 3/1056* (2020.01)
  *G01B 3/1061* (2020.01)

(56) References Cited

U.S. PATENT DOCUMENTS

| | | | |
|---|---|---|---|
| 2,942,344 | A | 6/1960 | Brannock |
| 2,948,964 | A | 8/1960 | Guillermo |
| 3,271,861 | A | 9/1966 | Fusco |
| 3,757,418 | A | 9/1973 | Stiebel |
| 3,834,029 | A | 9/1974 | Stiebel |
| D273,212 | S | 3/1984 | Sahler |
| 4,713,888 | A | 12/1987 | Broselow |
| 5,316,018 | A | 5/1994 | O'Brien |
| 5,406,716 | A | 4/1995 | Rubinstein |
| 6,251,087 | B1 | 6/2001 | Sandifer |
| 6,389,709 | B1 | 5/2002 | Lunde |
| 6,971,185 | B2 | 12/2005 | Scarborough |
| 7,516,555 | B2 | 4/2009 | Sullivan |
| 7,676,936 | B2 | 3/2010 | Ball et al. |
| D708,529 | S | 7/2014 | Backer et al. |
| 8,898,921 | B1 | 12/2014 | Adorno |
| 9,228,817 | B2 | 1/2016 | Towns et al. |
| 9,351,666 | B2 | 5/2016 | Wojcieszak |
| 10,149,637 | B2 | 12/2018 | Latterman |
| 10,925,351 | B2 * | 2/2021 | Moore ................. A43D 1/027 |
| 11,503,880 | B2 * | 11/2022 | Waldrum ............. G01B 3/1061 |
| 2005/0131317 | A1 | 6/2005 | Oddsson et al. |
| 2008/0184572 | A1 | 8/2008 | Hay et al. |
| 2009/0126210 | A1 | 5/2009 | Ball |
| 2011/0258869 | A1 | 10/2011 | Bittkowski |
| 2013/0167391 | A1 * | 7/2013 | Pratinidhi ............ A61B 5/1074 33/512 |
| 2015/0201866 | A1 | 7/2015 | Wojcieszak et al. |
| 2019/0076059 | A1 | 3/2019 | Latterman |
| 2023/0157419 | A1 * | 5/2023 | Waldrum ............. G01B 3/1046 33/3 A |

FOREIGN PATENT DOCUMENTS

| | | |
|---|---|---|
| GB | 2368643 A | 5/2002 |
| KR | 20090040064 A | 4/2009 |

OTHER PUBLICATIONS

"Shoe Size Conversion" (Shoepassion) May 6, 2020; retrieved from <https://web.archive.org/web/20200506193652/https://www.shoepassion.com/shoe-encyclopae>.

International Search Report and Written Opinion in related PCT Application No. PCT/US2021/52693, dated Jan. 28, 2022 (20 pages).

* cited by examiner

SHOE SIZE MEASUREMENT DEVICES AND METHODS

CROSS-REFERENCE TO RELATED APPLICATIONS

This application is a continuation of, and claims priority under 35 U.S.C. § 120 to, U.S. patent application Ser. No. 17/489,367, filed Sep. 29, 2021, which will issue as U.S. Pat. No. 11,503,880 on Nov. 22, 2022, which claims benefit of priority to U.S. Provisional Patent Application No. 63/084,717, filed on Sep. 29, 2020 and U.S. Provisional Patent Application No. 63/130,024, filed on Dec. 23, 2020, each of which are herein fully incorporated by reference in their entirety.

FIELD

The present disclosure relates to devices for measuring a user's shoe size using barleycorn increments of measurement, particularly devices and methods for measuring a user's shoe size (e.g., length size and width) that fit around the user's foot and incorporate retractable tape measures.

BACKGROUND

Shoe size measurement devices, such as the designs reflected in U.S. Pat. Nos. 1,682,366 and 2,942,344 to Brannock, which issued in 1928 and 1960, respectively, have long been used for measuring the length and width of the human foot. Traditional devices commonly found at many shoe retailers have a planar base with an affixed heel rest consisting of having a separate right and left foot position. These devices are typically custom made from cast plastic, wood, cast metal or metal, and commonly use barleycorn increments of measurement. The traditional measurement system for shoe sizes in English-speaking countries, the barleycorn increment of measurement is equal to roughly 8.47 mm and is still predominantly used today to measure shoe sizes of English-speaking countries.

Though these traditional devices achieve the general objective of measuring a user's foot, they have several limitations. For example, they are often rigid, bulky, and inconvenient to store or transport, and can serve as a tripping hazard to prospective customers walking around a retailer. In addition to being inconvenient for storage at a customer's home, these designs are relatively expensive for most customers. In use, they can prove difficult for many users to operate without assistance from another person (e.g., due to difficulty in adjusting the rigid components and also for accurately reading the small measurement indicia while the user is standing with a properly positioned foot) and require perfect placement and alignment of the user's foot for accurate measurements. This often poses a significant problem for many users like infants and seniors where perfect foot placement and alignment for a sufficient duration to read measurements is impractical at best. Traditional designs are typically "cookie-cutter" and not individually tailored to a particular user, and thus less accurate, comfortable, and convenient for some users that don't have feet that conform to the "general public" as reflected by existing designs. Finally, and with increasing importance as the world navigates through a health pandemic, existing designs commonly used by shoe retailers are often unsanitary, with prospective customers positioning their (sometimes barefoot) feet in the devices one after the other with limited, if any, cleaning in between uses. And, of course, this is on top of the inconvenience and potential health risk of having to enter a crowded retailer store in the first place.

Accordingly, there is a need for an improved shoe measurement devices and methods to address the above-mentioned limitations. Embodiments of the present disclosure are directed to these and other considerations.

SUMMARY

Disclosed embodiments relate to measurement devices and related methods for users of any age and ability to conveniently and discreetly determine appropriate general footwear measurements. The device may include a housing having a contact edge configured to receive the heel or a first side edge of the user's foot, a retractable tape configured to extend outwardly from the housing, and a toe flange proximate the distal end of the retractable tape that is configured to receive the toe or a second side edge of the user's foot. The retractable tape may have indicia of barleycorn units of measurement that can easily be used to determine footwear sizes (length and width) in English speaking countries.

The disclosed devices and methods provide significant advantages over existing devices. For example, it enables users to measure any human's (e.g., a child, grandparent, etc.) foot at a time and location convenient to the user. The compact and retractable nature of the disclosed devices and methods, in some embodiments, allows for convenient storage and transport, with the devices being easy to use at gyms or on the field, while trying to fit for uniforms, childcare facilities or shoe retail outlets that want to encourage more online sales, and numerous other non-traditional shoe retailer locations. Several of these advantages were further highlighted during quarantine of an ongoing health pandemic, while many customers were restricted to their homes and assisted living homes. During that time, it was a necessity for many families to convert current shoe sizes for children and other family members who had outgrown every shoe in stock in the household during of the extended duration of quarantine and with the economy shifting to more online sales.

In some embodiments, disclosed devices may include an ergonomic non-planar rigid housing configured to fits into the palm of a user's hand. Within the housing, the device may contain a retractable tape measure with a flexible tape element of, for example, a plastic or metal material that is spooled around an automatic retractable mechanism. The tape element may include indicia of barleycorn units of measurements for adequate shoe sizing, though other measurements (e.g., those adjusted for individual shoemakers unique sizing) are contemplated. An upward facing flange may be positioned proximate a distal end of the flexible tape element and configured to receive a toe end or a first side surface (e.g., innermost or outermost side surface) of a user's foot. With this structure, the disclosed devices and methods can be used to conveniently measure fluctuating human foot sizes from birth, through infancy, youth, to adulthood for women, men and elderly individuals without help of additional persons and with the storage convenience and transportability of a compact device.

In use, in certain embodiments of the disclosed devices, the user may extend the measuring tape element from the container by holding the upward facing flange in one hand while holding the base of the device in the other hand and once the flexible tape is extended to the appropriate length the user places the longest toe against the upward facing flange and while extending the heel in a position that the retractable base is able to rest on the back side of the heel.

The user may then adjust the tape to the individual comfort and space that is preferred by the user then look to the indicia of barleycorn increments of measurements for shoe sizes on the flexible tape element to determine the accurate length of the foot that corresponds with a particular shoe size in English speaking countries. To measure the appropriate shoe width for the user's foot, the user can then turn the same device upside down and extend the retractable tape such that a contact surface of the housing contacts a first (e.g., outermost surface) of the user's foot and the now-downwardly facing flange contacts a second (e.g., innermost surface) of the user's foot proximate a widest part of the user's foot. That is, the user may place the predominantly upward facing flange into a downward motion hooking the widest part of the foot while extending the flexible tape on the top of the foot then allowing the base to rest against the opposite side of the widest point of the foot. When the proper personal tension is acquired by the user, he or she may read the appropriate markings on the retractable tape element to determine the appropriate width fit for footwear. The flange and or contact surface of the housing may be flexible and/or adjustable to better accommodate the different contact surfaces for a particular user's heal/toe versus innermost/outermost side surfaces and accommodate a range of users and foot sizes. The disclosed devices and methods are not intended to be limited in application to only footwear and may apply to numerous other designs, art, manufactured products, etc.

All publications, patents, and patent applications mentioned in this specification are herein incorporated by reference to the same extent as if each individual publication, patent, or patent application was specifically and individually indicated to be incorporated by reference.

The foregoing summarizes only a few aspects of the presently disclosed subject matter and is not intended to be reflective of the full scope of the presently disclosed subject matter as claimed. Additional features and advantages of the presently disclosed subject matter are set forth in the following description, may be apparent from the description, or may be learned by practicing the presently disclosed subject matter. Moreover, both the foregoing summary and following detailed description are exemplary and explanatory and are intended to provide further explanation of the presently disclosed subject matter as claimed.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
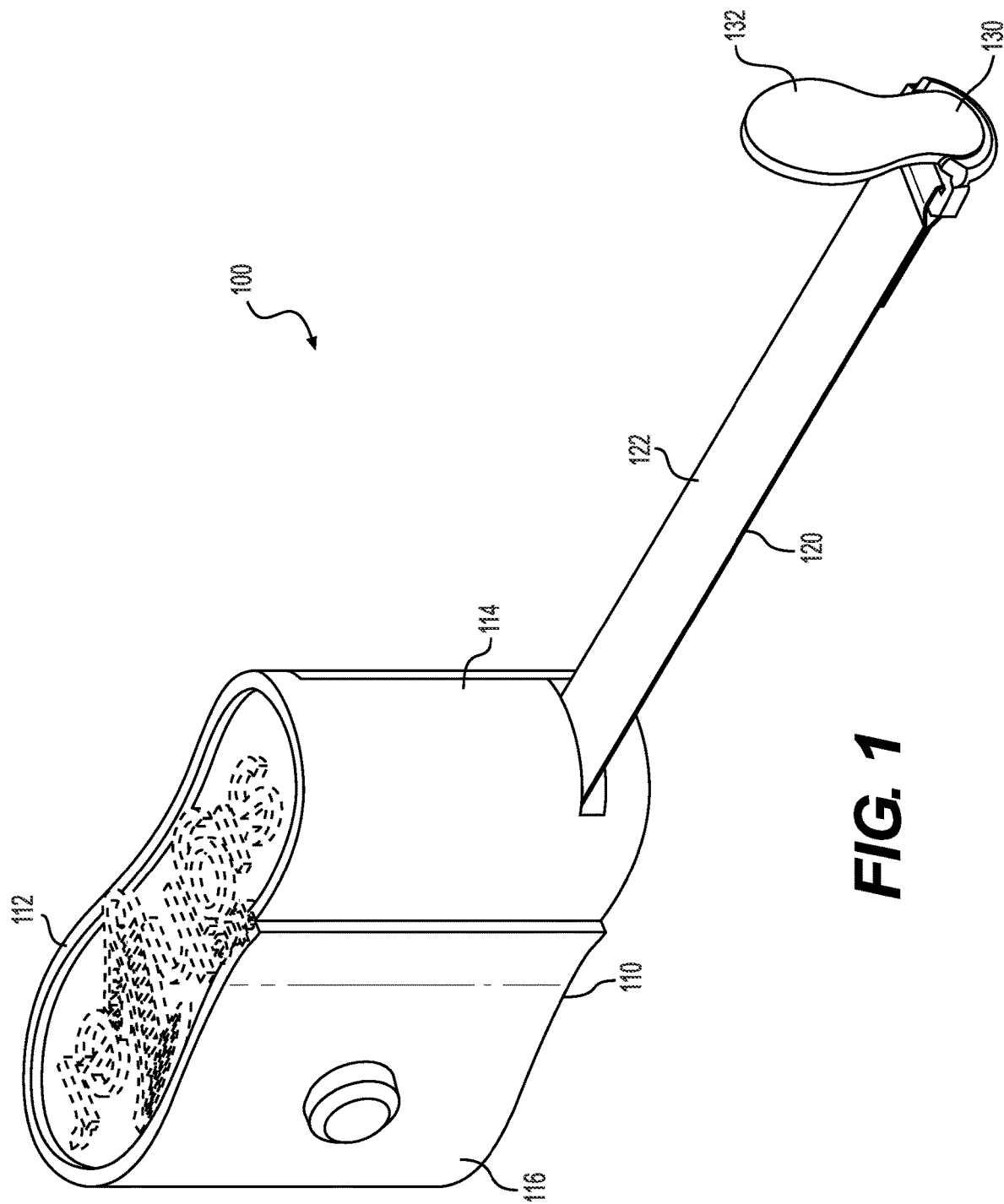
FIG. 1 is an elevated right side view of a measurement device having a housing, retractable tape measure, and outer flange, in accordance with some embodiments as disclosed herein.
Figure 2:
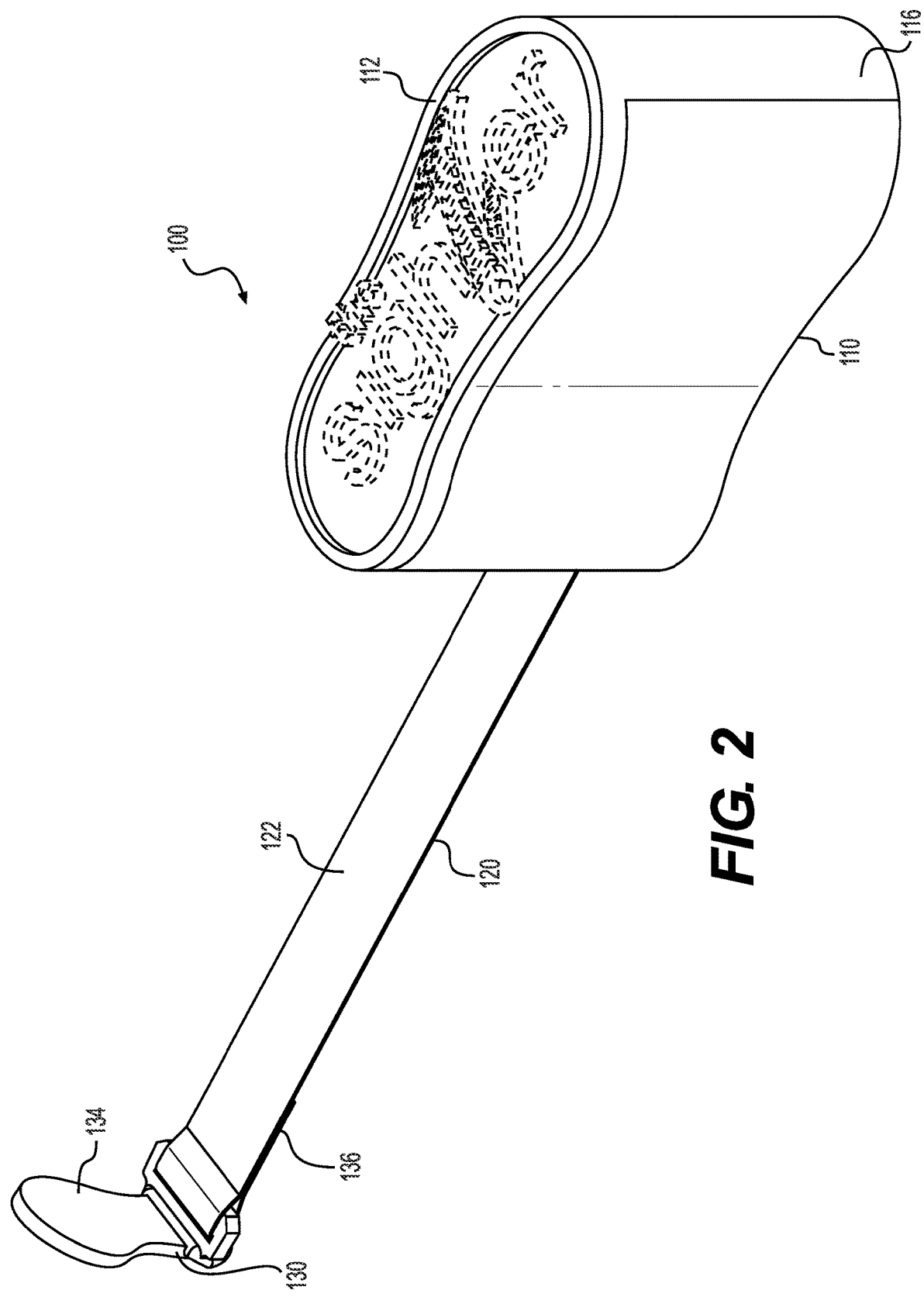
FIG. 2 is an elevated left side view of the measurement device shown in FIG. 1.
Figure 3:
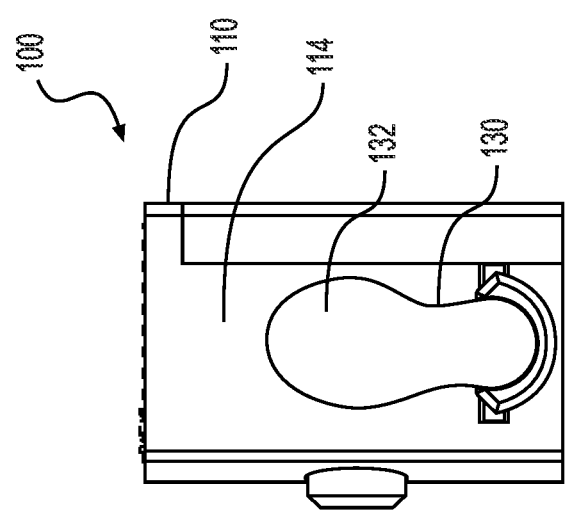
FIG. 3 is a front side view of the measurement device shown in FIGS. 1-2.
Figure 5:
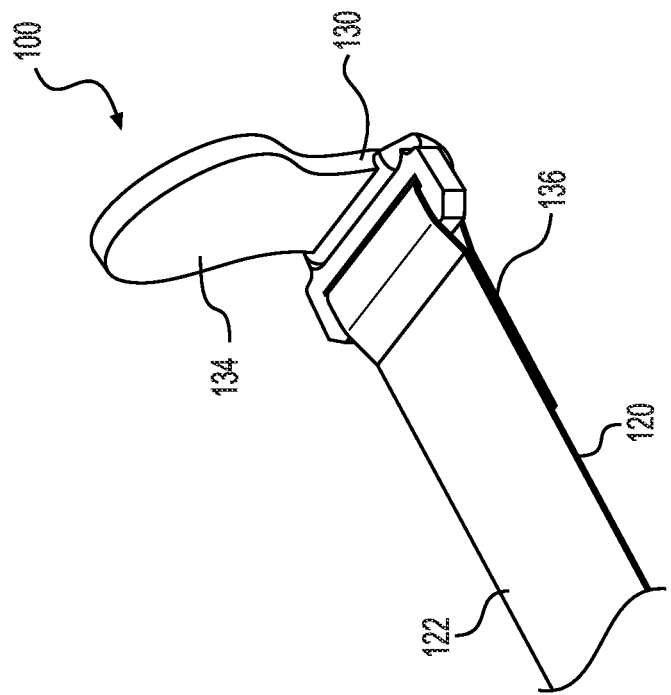
FIGS. 4-6 provide side, isometric, and top views, respectively, of the outer flange located at the distal end of an extended tape element of FIGS. 1-3.

In the art of shopping, more particularly shoe shopping, especially online purchases from the comfort of home, there is a very limited assortment of shoe measuring devices developed for individuals to use to determine the correct footwear size. Commonly available commercial devices are traditionally uncomfortable, unclean and typically used by the public. Disclosed devices and methods are directed to solving these and other challenges and enable users and prospective purchasers of new footwear to quickly, conveniently, and safely determine their appropriate and current shoe size. To accomplish this, in some embodiments the disclosed devices include a retractable tape measuring device, which may be custom made or an altered version of an off-the-shelf tape measure (e.g., a Stanley® Fatmax® 6' tape measure, model number FMHT33706 or other size/brand). In some embodiments, the retractable tape measure will include automatic retractable components that are configured to automatically re-spool a flexible tape element within a housing and selectively allow the flexible tape element to be extended away from the housing while in use. The flexible tape element can similarly be custom made or altered from the off-the-shelf version by replacing existing indicia with the indicia of barleycorn increments of measurements allowing an accurate general footwear size in English speaking countries. In other embodiments, indicia of other increments of measurement, such as modified barleycorn increments to correspond with shoemaker-specific sizing, are contemplated. The measurement devices may also include an upward facing toe flange, which may replace the predominantly downward facing flange that is typically positioned on the distal end of the flexible tape element of an off-the-shelf retractable tape measure. In some embodiments, the toe flange may be hand carved or otherwise constructed (e.g., casted, 3-D printed, etc.) out of wax or another material or combination of materials. The toe flange may be attached to flexible tape measure in several ways, including via a rivet though other mechanical connectors and chemical adhesives are contemplated. Additionally, the flange may contain a hoop structure extending perpendicularly from the flange, which the flexible tape element can then be wrapped through. With this structure, according to some embodiments, a disclosed personal retractable measurement device with indicia of barleycorn increments of measurement can be used to measure footwear in English speaking countries.

Various embodiments of the disclosed measurement devices and methods will now be disclosed with respect to the provided figures for exemplary purposes.

FIGS. 1-3, 8-9, 12-13 illustrate an exemplary measurement device 100 in accordance with some embodiments. As shown, measurement device 100 may include a housing 110, a retractable tape element 120 configured to selectively extend away from housing 110, and a toe flange 130 positioned proximate a distal end of tape element 120.

Housing 110 may be shaped such that it is configured to be easily gripped by the user's hand and conform to the user's foot being measured. As shown, housing 110 may include a top surface 112, a foot contact surface 114, one or more grip side surfaces 116, and a bottom surface 118. Housing 110 may be shaped to resemble a shoe and/or foot from the top or bottom view to help a user quickly identify measurement device 100, stabilize the device 100 when in use, and/or to improve the aesthetics thereof. Housing 110 may have a height that relates to the user's foot size (youth, women, and men).

Optionally, in other embodiments, housing 110 may include a slidable or pushable button for selectively fixing and releasing tape element 120, though it is contemplated that housing 110 may contain a spring or other mechanism to achieve a desired resistance level to snuggly conform to the user's foot without having to hold tape element 120 in a static position. In other embodiments, the button may also be used to change the desired resistance level of the tape element 120 from a more resistive setting (making it harder to pull out) or a less resistive setting (making it easier to pull out). In some embodiments, the tape element 120 may stay in place once extended by the user. The button, when pressed, is then used to retract the tape element 120. Additionally, the tape element 120 also may contain detents that allow it to click in a certain position. The button may be sized to be pushed by a user's thumb. The button may also be positioned perpendicularly to the direction of extension of the retractable tape element.

Further, housing 110 may also include a clip or connector (not shown) to allow for convenient carrying (e.g., on a belt) or storage (e.g., on a wall or cabinet) or to hold measurement device 100 in place (e.g., on the base surface) during use, if desired. In some embodiments, the connector may be magnetic connector for easy storage on a metal wall or to help measurement device 100 lay flat on the floor during measurement without requiring that it be maintained in a single position, which may be advantageous in certain embodiments (e.g., when wrestling a toddler's kicking feet). The housing 110 may also contain a spool and a spring for retracting and storing the tape element. To hold the spool, the housing 110 may contain additional internal features to retain the spool within the housing 110, and retain the tape element on the spool.

Collectively, top surface 112, grip side surface(s) 116, and/or bottom surface 118 may be shaped and/or textured to allow for convenient and secure gripping by the user during placement of measurement device 100 below one of the user's feet. That is, in some embodiments, top surface 112 may be at least partially rounded at its back end to compliment a shape of the user's palm while grip side surface(s) 116 have textured ribs and/or one or more finger and thumb grips to be securely gripped by the user's fingers and thumb when held with the user's palm on top surface 112. Although not shown, bottom surface 118 may include one or more finger cutouts to provide clearance space for a user with long fingers that extend beyond grip side surface(s) 116 to bottom surface 118 to allow the non-cutout portion of bottom surface 118 to rest flat on the ground or base surface without the user's fingers being undesirably squished between bottom surface 118 and the base surface. By allowing bottom surface 118 of measurement device 100 to lie flat on the base surface, the user can achieve more accurate measurements. In other embodiments, the bottom surface 118 may be completely level to keep the device stable while in use. In another embodiment, the bottom surface 118 may be flat, weighted, contoured, or contain non-slip material. One or more surfaces of housing 110 (e.g., top surface 112, grip side surface(s) 116, and bottom surface 118) may be made of plastic to help decrease production costs, metal for improved durability, and/or a plush material to make it soft and less dangerous for infants and children. One or more surfaces of housing 110 (e.g., top surface 112, grip side surface(s) 116, and bottom surface 118) may be sized and shaped to be particularly suited for certain types of users, including infants, youth, men, women, and right- or left-handed users, and may be constructed with an adjustable or malleable material (e.g., a putty or flexible resin that can harden into a permanent or semi-permanent shape) so the user can personalize the size and shape of the device for his or her own grip.

Figure 15:
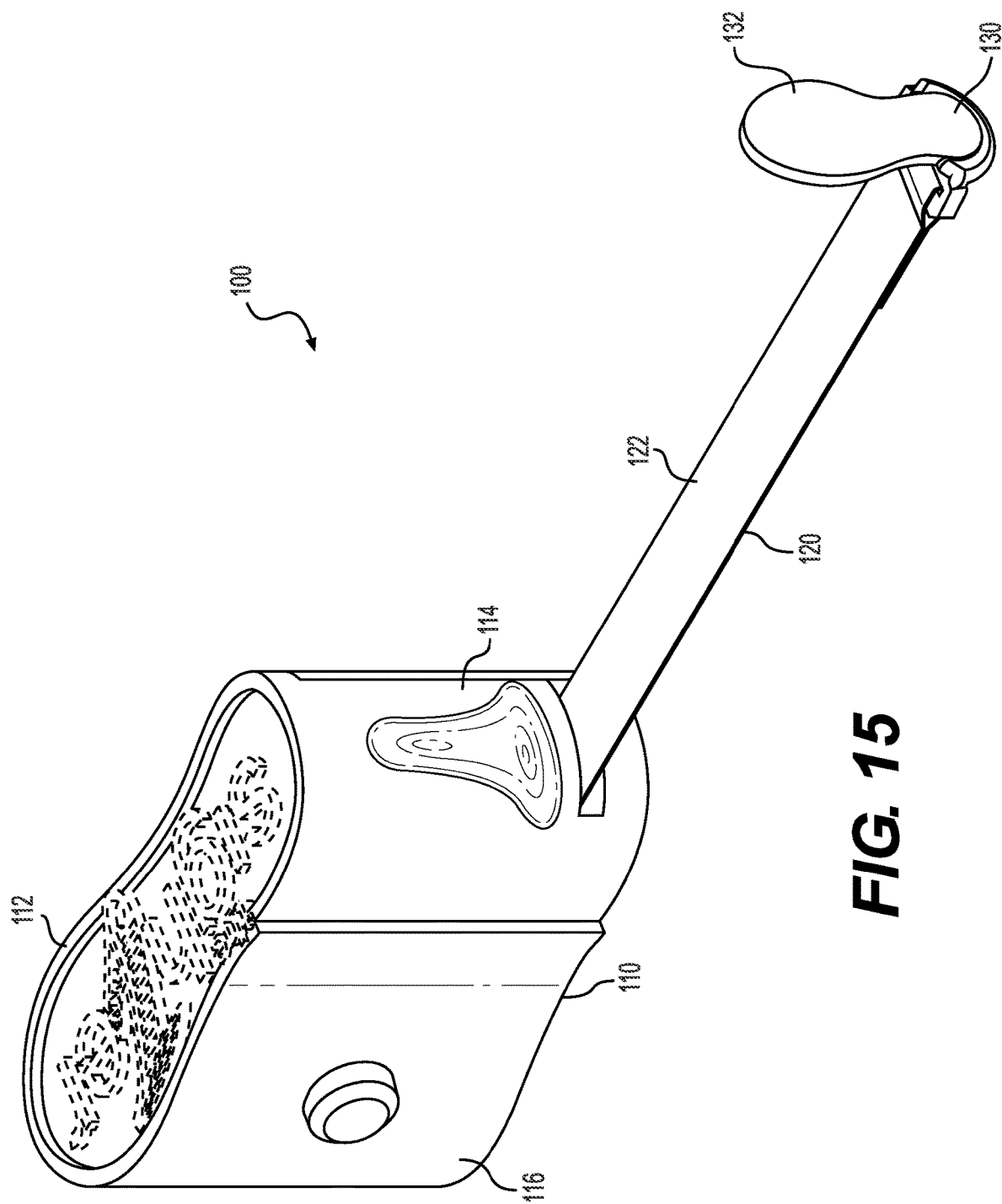
FIG. 15 shows an embodiment of the measurement device with topographic contours for the heel and the side of a foot.

Opposite those other surfaces of housing 110, foot contact surface 114 may be contoured to receive a heel and/or side surface of the user's foot. Foot contact surface 114 may include a plurality of topographical heel contours for variously sized heels such that a smaller heel can snuggly fit within the smallest contour while a larger heel can snuggly fit within a larger contour, as shown in FIG. 15. It is contemplated that multiple sets of indicia, which may be offset or color coded, may be used to properly align with the starting point for the heel of each contour size.

The foot contact surface 114 may have a generally concave structure to receive at least a portion of the user's foot. The focal point of the concavity can vary based on the differences of the size of the heel each contour is designed to fit. The contours may extend up the entire side of the housing 110 or may only extend a portion of the height of the housing 110. The foot contact surface 114 may have a concave surface designed to fit a side of the foot. The concave surface for the side of the foot may extend on a lower portion of the side of the housing 110, where the concave surface for the heel of the foot may extend on an upper portion of the side of the housing 110.

Figure 4:
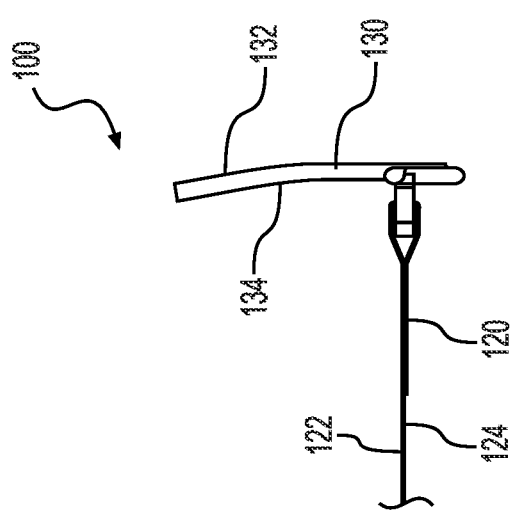
Figure 6:
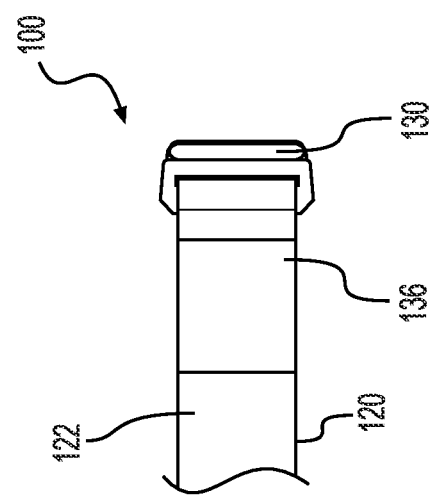
Figure 14:
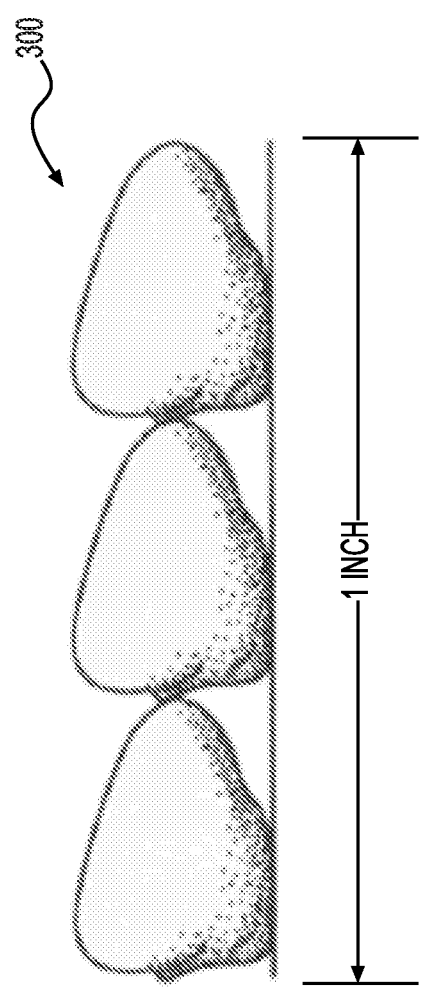
FIG. 14 shows exemplary units of barleycorn increments of measurement relative to an inch.

At least partially contained within housing 110 and configured to selectively extend away from housing 110, retractable tape element 120 may have a top surface 122 and a bottom surface 124 as shown more clearly in FIG. 4. The tape element 120 may be made of a soft material, for example vinyl, which is less likely to cut the user when retracted. The tape element 120 could also be made of metal. Top surface 122 may contain a plurality of measurement indicia associated with measuring a shoe size associated with a length of the user's foot, which may include barleycorn units of indicia (see relative size of barleycorn units compared to inches in FIG. 14) and/or shoemaker specific shoe sizes. Conversely, bottom surface 124 may contain a plurality of measurement indicia associated with measuring a shoe width associated with a width of the user's foot, which may include barleycorn units of indicia (see relative size of barleycorn units compared to inches in FIG. 14) and/or shoemaker specific shoe sizes. It is contemplated that either top or bottom surface 122, 124 may include one or more magnification lenses (not shown) to help a user read the indicia. Alternatively, in other embodiments, such magnification lenses may extend from foot contact surface 114 or another portion of housing 110 to remain in a fixed position overlaying indicia on tape element 120, which is configured to extend and retract. It is further contemplated that the top surface 112 of the housing 110 could contain an aperture that allows the user to see tape element 120 through housing 110. This would allow the user to read the size indicated on the tape element 120 while using on the device. In another embodiment, the aperture could be replaced by a viewing window, magnification lens, or digital readout of the tape element 120 to help the user read the indicia. This would allow the user to read the indicia on the tape comfortably from a distance and aids in the measurement of the foot.

Proximate the distal end of tape element 120, toe flange 130 may include an outer surface 132, and a toe contact surface 134 that secures toe flange 130 to tape element 120 via one or more connectors including rivets or adhesive. Additionally, the flange 130 may contain a hoop structure extending perpendicularly from the flange. The flexible tape element may wrap through the hoop structure and reattach to itself using a variety of methods, such as adhesive, at attachment point 136. The toe flange 130 may be shaped to resemble a shoe. Toe contact surface 134 may be contoured to conform to the user's toe when measuring for length and/or to the side surface of the user's foot proximate a widest part when measuring for width. A slight contour at a central portion of the toe contact surface 134 allows the toe contact surface to engage with the top of the toe from the bottom of the foot and maintain engagement with the toe during the measurement, which makes it easier for the user to measure. In some embodiments, the toe contact surface may have a length of 0.5 inch to 1.5 inches. In other embodiments, the toe contact surface may have a length of one inch. In some embodiments the toe contact surface 134 may be flat. Toe contact surface 134 may be configured to compress towards tape element 120 (e.g., via a spring or resistant straps) to better grip the user's foot, and the tension level may be adjustable by the user (e.g., by adjusting positioning of the spring or resistant straps). Furthermore, the flange 130 may be positioned at a 90 degree angle to the tape element 120. In other embodiments, the flange 130 may be positioned at a larger angle than 90 degrees to allow the flange 130 engage with the side of the foot. In other embodiments, the angle of the flange may be adjustable.

It is contemplated that the any mechanical members used to help establish and adjust a tension level of toe contact surface 134 against the user's foot (towards to tape element 120) may be in communication with and controlled by a controller (not shown) having one or more processors and configured to receive signals associated with adjusting tension levels from a user computing device. In addition to adjusting the tension to a preset level, the controller may be in communication with one or more pressure sensors (not shown) configured to measure a pressure applied against toe contact surface 134 by the user's foot. The controller may be configured to determine and provide one or more suggestions (e.g., to increase shoe size or suggest shoe sizes for running shoes versus casual shoes, etc.) to the user via the user computing device.

Figure 7:
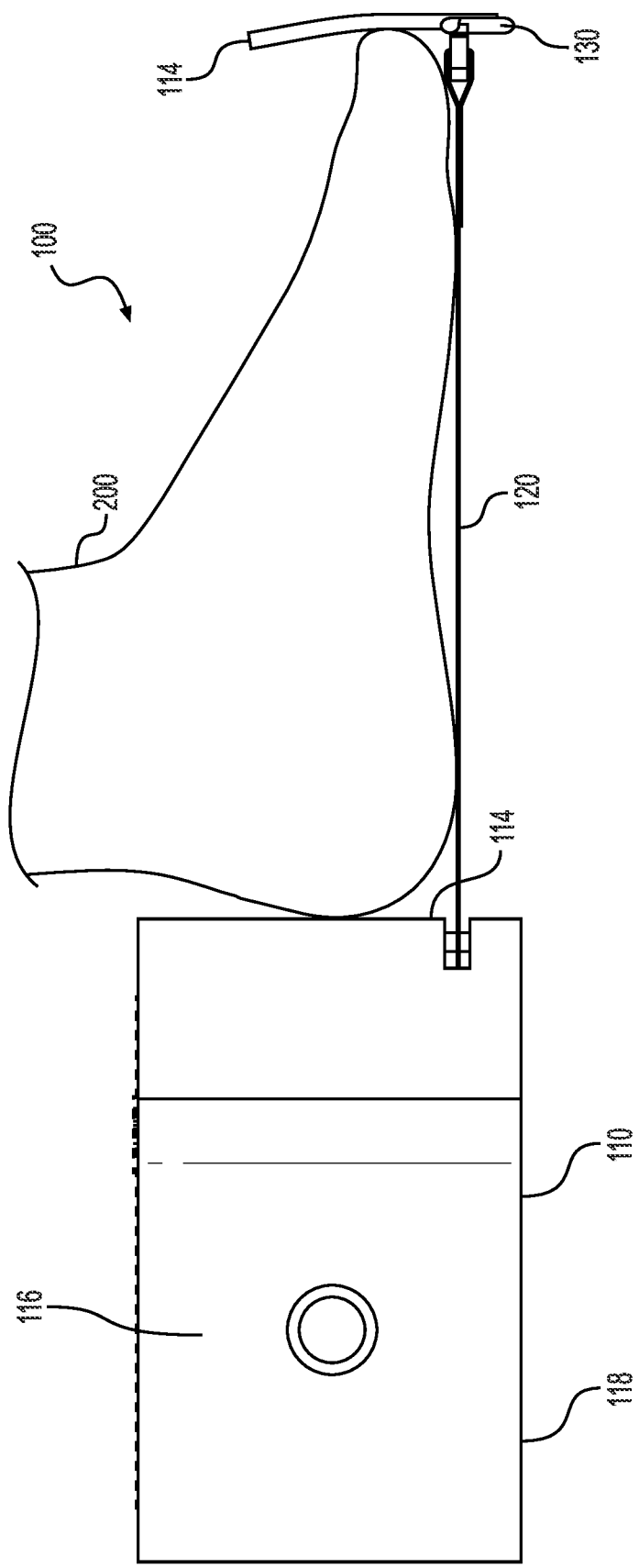
FIG. 7 is right side view of the measurement device of FIG. 1 in use with the human foot, in accordance with some embodiments.
Figure 8:
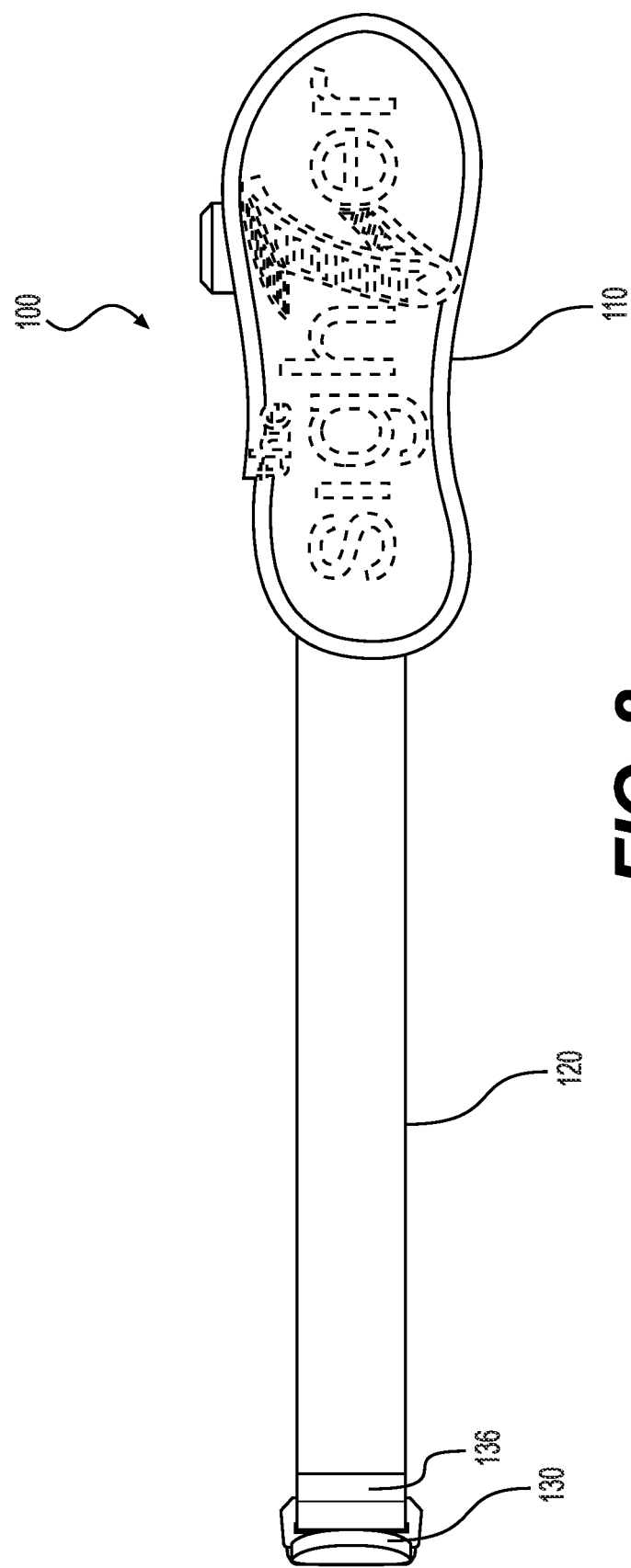
FIG. 8 is an overhead view of the measurement device of FIG. 1.
Figure 9:
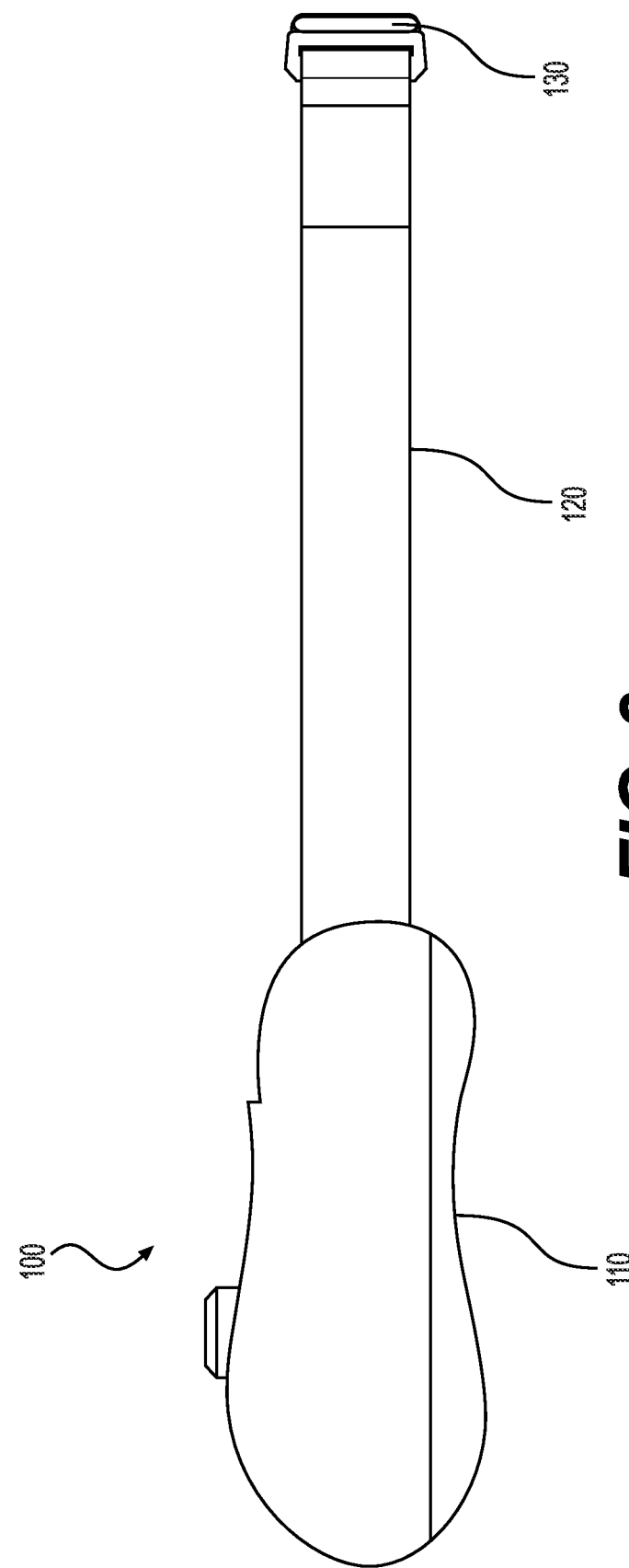
FIG. 9 is a bottom view of the measurement device of FIG. 1.

In use, to measure a shoe size associated with a length of the user's foot 200 as shown in FIG. 7, the user may extend toe flange 130 away from housing 110 and place her foot 200 on top of tape element 120. In some embodiments, this may involve holding housing 110 in place flat against the floor with the user's hand or via a clip or connector, which may be magnetic, on housing 110 (not shown). The user may fix the position of tape element 120 via a pushable or slidable button on housing 110 or simply allow toe flange 130 to compress against the user's left toe while the user's heel contacts foot contact surface 114. Alternatively, the retraction mechanism configured to retract tape element 120 within housing 110 may be configured to fix a position of tape element 120 for a limited time duration or until it is manually pulled away or pushed towards housing 110 beyond a predetermined distance or force threshold by the user. Either way, the user can remove her foot from measurement device 100 and read the measured shoe size.

Figure 10:
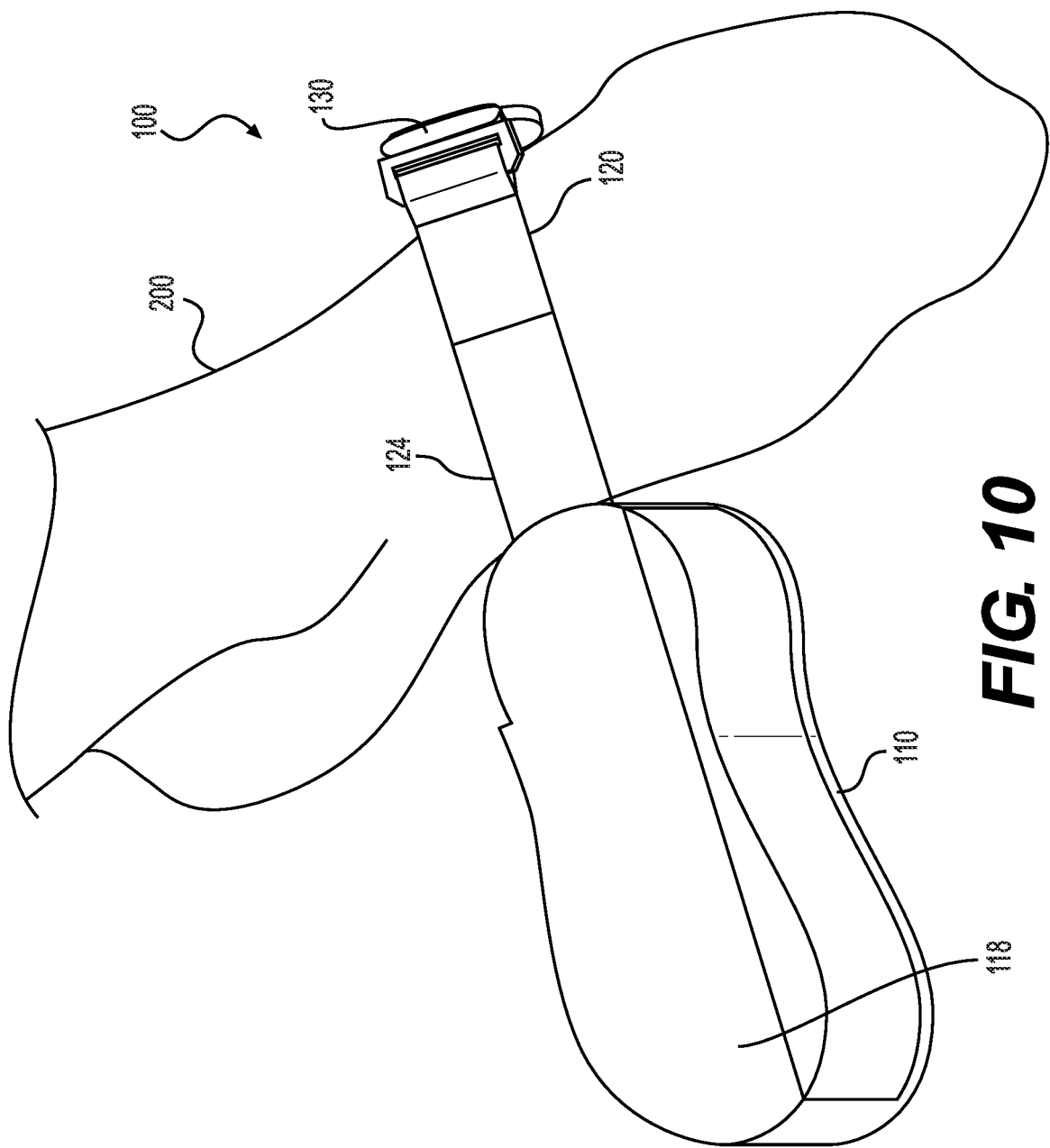
FIGS. 10-11 provide elevated right side and right side views, respectively, of the measurement device of FIGS. 1-9 being alternatively used to measure the width of a human foot, in accordance with some embodiments.
Figure 11:
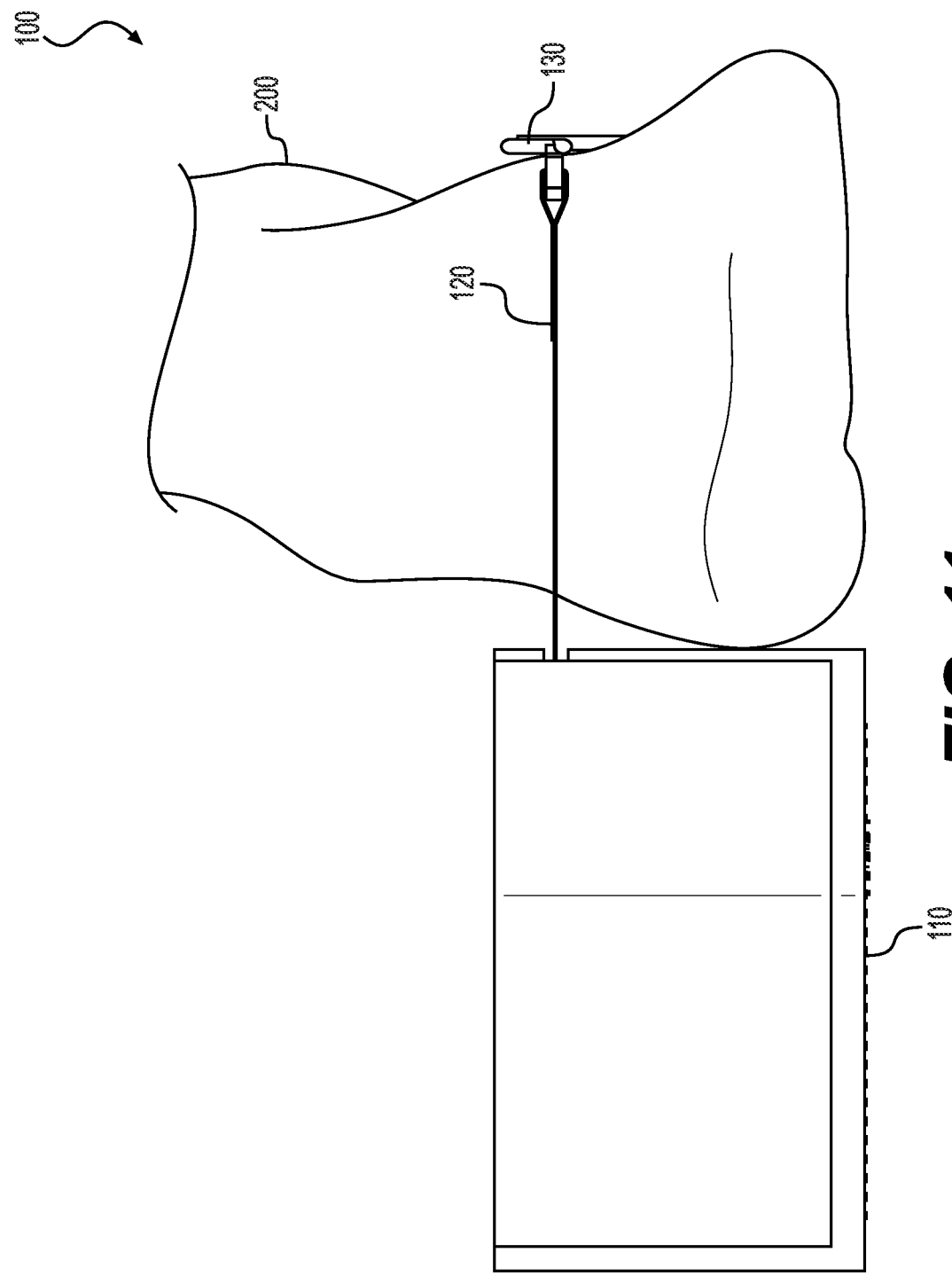
Figure 13:
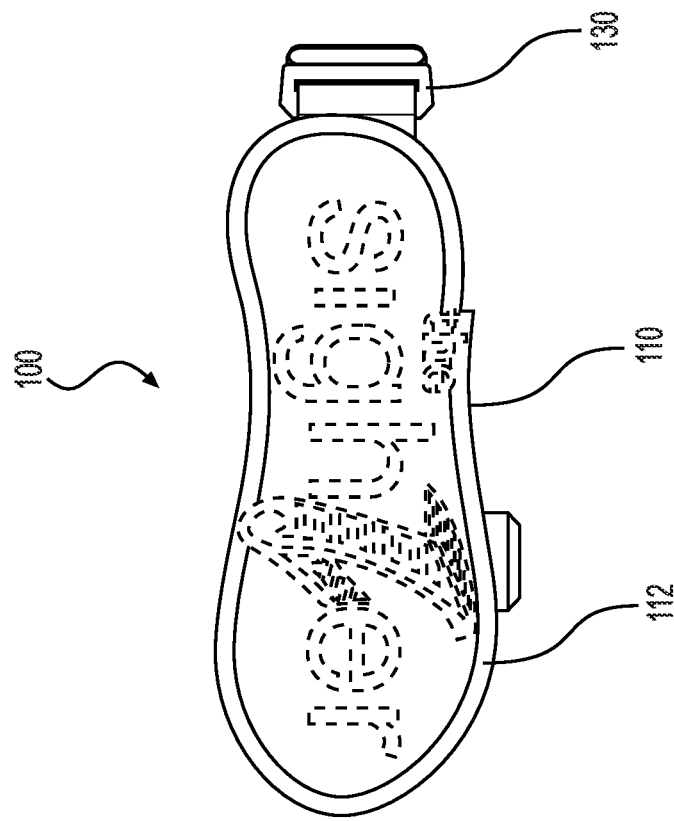
FIGS. 12-13 provide bottom and overhead views of the measurement device of FIG. 1 in a compact form, in accordance with some embodiments.
Figure 12:
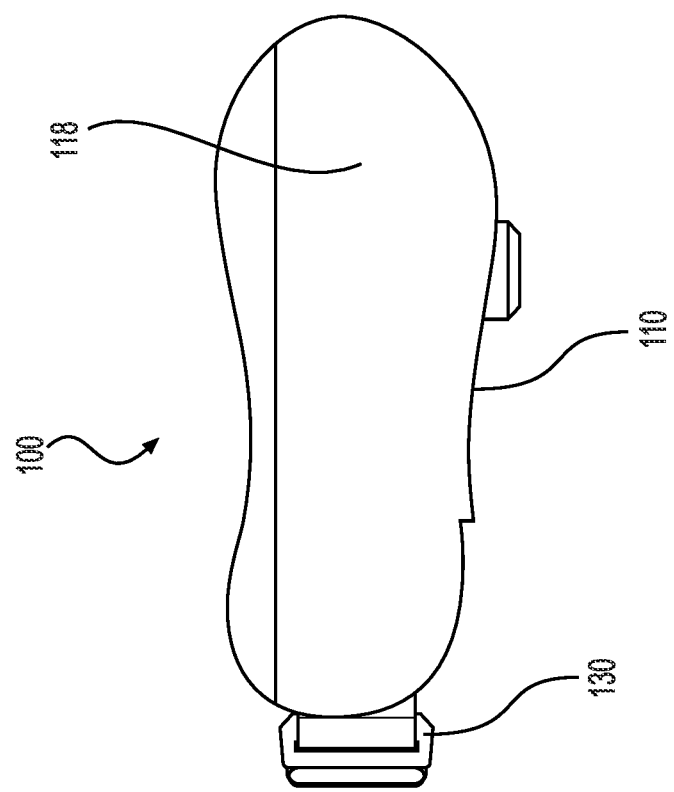

To measure the shoe width associated with a maximum width of the user's foot 200 as shown in FIG. 10, the user would flip measurement device 100 upside down but largely follow the same process above. That it, the user would extend tape element 120 such that toe flange 130 would be placed to contour around an inside surface of the user's foot 200 proximate a widest section of the foot. The user would extend tape element 120 away from toe flange 130 until housing 110 could lie flat on the base surface proximate an outer surface of the user's foot 200. The user can slide housing 110 until foot contact surface 114 contacts the outside surface of her foot and the desired tension level is reached. Because the indicia on bottom surface 124 of tape element 120 are visible above the user's foot, she can read the measured shoe width while measurement device 100 is in the in-use position or the position of tape element 120 may be fixed in place as described above to allow the user to read the measured shoe width when measurement device 100 is not in-use on her foot to advantageously make it easier to read (e.g., for seniors who have difficulty reading indicia from further away or a parent fighting a toddler's kicking feet).

Optionally, for measuring the length and/or width, a controller may be in communication with one or more pressure sensors and ratcheting or tension mechanisms to measure and control the pressure to retract tape element 120 and/or apply tension to toe flange 130 against the user's toe. The controller may also be configured to determine an optimal shoe size (e.g., via pressure measurements and size readings based on one or more position sensors disposed in tape element 120 and/or optical character recognition ("OCR") devices configured to read indicia on tape element 120 where it exits housing 110) and communicate its determinations to the user (e.g., via the user's computing device) for convenient and accurate measurement readings as well as to track the user's foot size over time.

Optionally, the controller and one or more pressure sensors may be used to calculate the approximate weight of the user. The weight of the user can then be used by the controller to determine which category the user should use to determine shoe size (man, woman, or youth). The controller can adjust the tension level preset in the tape element 120 based on the category of shoe size. For example, the tension level preset of the tape element 120 for a child or toddler would be set lower than that of an adult so that the child has more moving room while being measured. This is advantageous because it would prevent children from feeling encapsulated while being measured, which can lead to children becoming frustrated with the measuring process.

The design and functionality described in this application is intended to be exemplary in nature and is not intended to limit the instant disclosure in any way. Those having ordinary skill in the art will appreciate that the teachings of the disclosure may be implemented in a variety of suitable forms, including those forms disclosed herein and additional forms known to those having ordinary skill in the art. This disclosure is intended to cover various modifications and equivalent arrangements included within the scope of the appended claims. Although specific terms are employed herein, they are used in a generic and descriptive sense only and not for purposes of limitation.

As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising". In this disclosure the term "about" or "approximately" can mean a range of up to 10% of a given value. In this disclosure the term "substantially" refers to something which is done to a great extent or degree.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A shoe size measurement device comprising:
a housing comprising a first contact surface;
a retractable tape element displaying indicia configured to selectively extend away from the housing; and
a flange positioned proximate a distal end of the tape element, the flange configured to contact a first portion of a user's foot and comprising a concavely contoured second contact surface.

2. The device of claim 1, wherein:
the first contact surface is configured to contact a second portion of the user's foot;
the retractable tape element comprises top and bottom surfaces, with at least one of the top and bottom surfaces having indicia associated with shoe sizes; and
the flange further comprises a downwardly extending portion.

3. The device of claim 2, wherein:
the retractable tape element has multiple sets of indicia associated with shoe sizes; and
at least one of the indicia of the multiple sets of indicia comprises barleycorn units of measurement.

4. The device of claim 3, wherein the top and bottom surfaces of the tape element each have indicia associated with shoe sizes.

5. The device of claim 1, wherein:
the flange has a shape resembling a shoe; and
the housing contains a viewing window configured to make at least a portion of the indicia viewable from outside the housing.

6. The device of claim 1, wherein:
the contact surface is a toe contact surface;
the housing contains a retraction element configured to spool the tape element; and
the tape element is flexible.

7. The device of claim 1, wherein the flange comprises a T-shaped plate having an upwardly extending portion, the downwardly extending portion, and a lateral portion that attaches to the tape element, the upwardly extending portion being longer than the downwardly extending portion.

8. The device of claim 1, wherein the housing further comprises one or more contoured side surfaces, at least one of the one or more contoured side surfaces having one or more recesses.

9. The device of claim 1, wherein the housing is predominantly shoe-shaped and further comprises a flat bottom surface.

10. The device of claim 1, wherein the retractable tape element is configured to remain at a fixed position once at least partially extended and the housing further comprises a selectable button protruding from the housing, wherein the selectable button is configured to retract the retractable tape element.

11. A shoe size measurement device comprising:
a housing comprising a first contact surface configured with one or more topographic contours;
a retractable tape element displaying indicia associated with shoe sizes configured to selectively extend away from the housing; and
a flange positioned proximate a distal end of the tape element, the flange comprising a second contact surface.

12. The device of claim 11, wherein a first topographic contour of the one or more topographic contours is configured to fit a smaller shaped heel and a second topographic contour of the one or more topographic contours is configured to fit a larger shaped heel.

13. The device of claim 11, wherein the indicia associated with shoe sizes is aligned with a starting point of the one or more topographic contours.

14. The device of claim 11, wherein the one or more topographic contours are configured to fit a side of the user's foot.

15. The device of claim 11, wherein a first topographic contour of the one or more topographic contours is configured to fit a heel and a second topographic contour of the one or more topographic contours is configured to fit a side of the user's foot.

16. The device of claim 11, wherein:
the top and bottom surfaces of the tape element each have indicia associated with shoe sizes;
the indicia associated with shoe sizes comprises barleycorn units of measurement; and
the housing contains a viewing window to allow the user to see the indicia on the retractable tape element through the housing.

17. A shoe size measurement device comprising:
a housing comprising a first contact surface;

a retractable tape element displaying indicia associated with shoe sizes configured to selectively extend away from the housing; and a flange positioned proximate a distal end of the retractable tape element, the flange comprising a second contact surface, wherein the second contact surface of the flange has a non-flat contoured shape.

18. The device of claim 17, wherein the second contact surface is contoured to hook around one or more of an end of a toe of the user's foot and a side of the user's foot.

19. The device of claim 18, wherein the second contact surface is contoured to hook around both the end of the toe of the user's foot and the side of user's foot, and the top and bottom surfaces of the tape element each have indicia associated with shoe sizes.

20. The device of claim 17, wherein the housing further comprises:
   a tension adjustment mechanism for adjusting tension measurements of the retractable tape element;
   one or more pressure sensors positioned proximate to the retractable tape element configured to measure a pressure applied against the flange by the user's foot;
   a digital display; and
   a controller in communication with the one or more pressure sensors and the digital display, wherein the controller is configured to calculate the weight of the user, categorize the user in one of a plurality of predetermined classes, and select measurement indicia associated with one of the plurality of predetermined classes in which the user is categorized.

* * * * *